Feb. 13, 1923.

V. H. GORHY.
SOIL PULVERIZER.
FILED OCT. 27, 1921.

1,445,506.

Inventor
Virgil H. Gorhy,

By

Attorney

Patented Feb. 13, 1923.

1,445,506

UNITED STATES PATENT OFFICE.

VIRGIL H. GORHY, OF SILVER HILL, WEST VIRGINIA.

SOIL PULVERIZER.

Application filed October 27, 1921. Serial No. 510,835.

*To all whom it may concern:*

Be it known that VIRGIL H. GORHY, a citizen of the United States of America, residing at Silver Hill, in the county of Wetzel and State of West Virginia, has invented new and useful Improvements in Soil Pulverizers, of which the following is a specification.

The object of the invention is to provide a simple and efficient means for effecting the surface pulverization of soil for the purpose of forming a suitable seed bed preparatory to planting; and with this object in view the invention consists in a construction and combination of parts of which a preferred embodiment is shown in the accompanying drawings, wherein.

Figure 1:
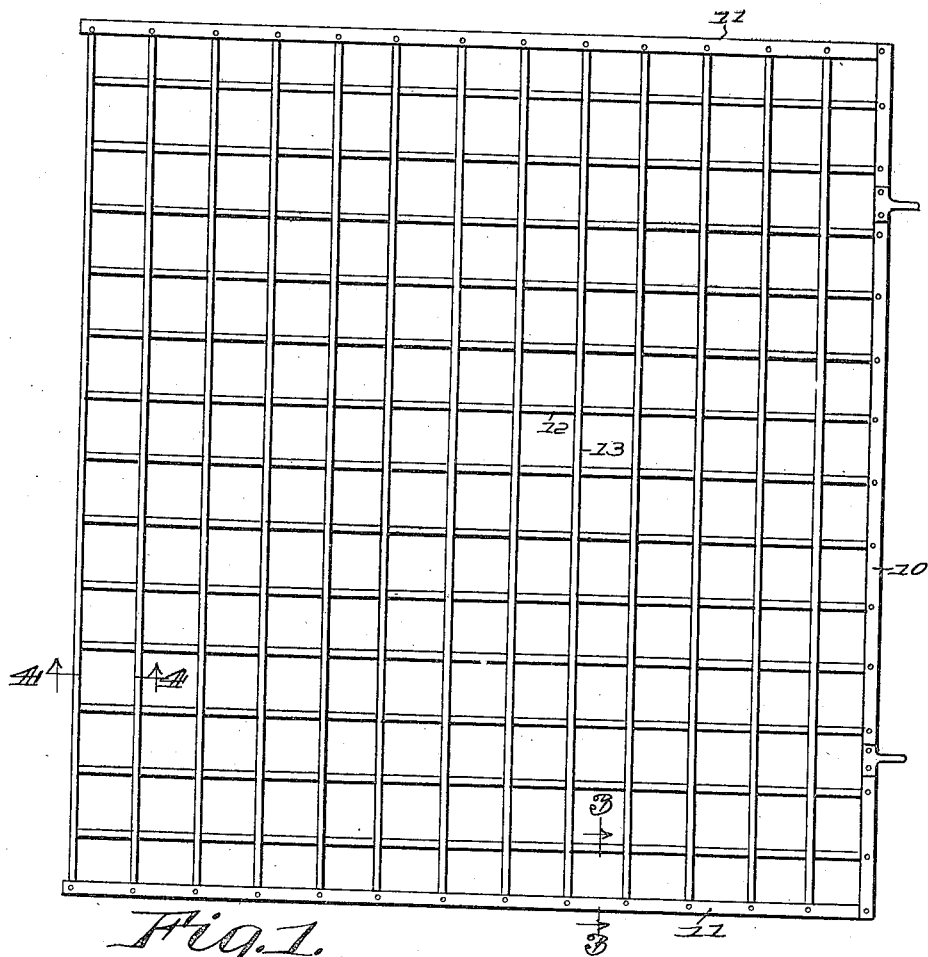
Figure 1 is a plan view of an implement embodying the invention.
Figure 2:
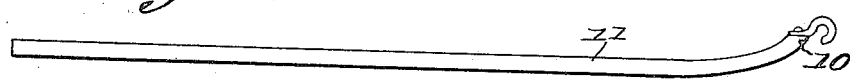
Figure 2 is a side view of the same.
Figure 3:
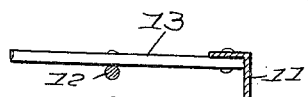
Figure 4:

Figures 3 and 4 are detail sectional views respectively on the lines 3—3 and 4—4 of Figure 1.

The device which is designed for use as a drag consists of a three sided frame having the front draft bar 10 and the side marginal bars 11 preferably constructed of angle iron, within which is arranged a filler consisting of longitudinal and transverse cross sectionally angular bars 12 and 13 of which the former are terminally attached to the draft bar 10 and the latter to the side bars 11 with the transverse bars extending above the longitudinal bars and riveted respectively thereto at the points of intersection to constitute a net work with intervening spaces which in practice may be made of an area approximating four and one-half inches square as by having the filler bars of one and one-half inches in diameter disposed on six inch centers.

The side bars are curved upward at their forward ends to form runners designed to carry the draft bar over uneven portions of the surface traversed and subject clogs and lumps of the loose surface soil to the action of the intersecting filler bars which, however, being of comparatively shallow depth with open spaces between the same permit of the passage of the earth over the same to avoid bodily shifting any considerable portion of the same while effectively rolling and agitating the same to produce the necessary granulation.

Having described the invention, what is claimed as new and useful is:—

1. A soil pulverizing implement having a frame provided in the plane thereof with a filler consisting of longitudinal bars and transverse bars arranged in intersecting relations.

2. A soil pulverizing implement having a frame provided in a plane between the upper and lower edges thereof with a filler consisting of longitudinal and transverse intersecting bars of which the transverse bars extend above the plane of the longitudinal bars.

3. A soil pulverizing implement having a frame provided in a plane between the upper and lower edges of its side members with a filler consisting of longitudinal and transverse intersecting bars of which the transverse bars are disposed above the plane of the longitudinal bars.

4. A soil pulverizing implement having a frame provided in the plane thereof with a filler consisting of longitudinal and transverse intersecting bars, said frame consisting of a front draft bar and side marginal bars of which the latter are curved upward at their front ends to form runners.

5. A soil pulverizing implement having a frame provided in the plane thereof with a filler consisting of longitudinal and transverse intersecting bars, the frame consisting of angle bars and the filler elements of bars which are angular in cross section.

In testimony whereof he affixes his signature.

VIRGIL H. GORHY.